(12) United States Patent
Shah et al.

(10) Patent No.: US 12,279,113 B2
(45) Date of Patent: Apr. 15, 2025

(54) METHOD AND UNCONSTRAINED UE FOR COMMUNICATION OF CONSTRAINED UE WITH MSGIN5G SERVER

(71) Applicant: Samsung Electronics Co., Ltd., Suwon-si (KR)

(72) Inventors: Sapan Pramodkumar Shah, Bangalore (IN); Basavaraj Jayawant Pattan, Bangalore (IN); Narendranath Durga Tangudu, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 17/572,865

(22) Filed: Jan. 11, 2022

(65) Prior Publication Data

US 2022/0225096 A1 Jul. 14, 2022

(30) Foreign Application Priority Data

Jan. 12, 2021 (IN) .............................. 202141001466
Jul. 7, 2021 (IN) .............................. 202141030562
Dec. 8, 2021 (IN) .............................. 2021 41001466

(51) Int. Cl.
*H04L 9/40* (2022.01)
*H04W 4/12* (2009.01)
(Continued)

(52) U.S. Cl.
CPC ........... *H04W 12/068* (2021.01); *H04W 4/12* (2013.01); *H04W 60/04* (2013.01); *H04W 60/06* (2013.01)

(58) Field of Classification Search
CPC . H04W 12/068; H04W 12/08; H04W 12/069; H04W 4/12; H04W 4/70;
(Continued)

(56) References Cited

U.S. PATENT DOCUMENTS

2008/0045246 A1 2/2008 Murtagh et al.
2020/0252813 A1 8/2020 Li et al.

FOREIGN PATENT DOCUMENTS

EP 2 683 183 A1 1/2014

OTHER PUBLICATIONS

Convida Wireless LLC, FS_5GMARCH nomenclature alignment, S6-201819, 3GPP TSG-SA WG6 Meeting #39-bis-e, Oct. 7, 2020, e-meeting.
(Continued)

*Primary Examiner* — Brian F Shaw
(74) *Attorney, Agent, or Firm* — Jefferson IP Law, LLP

(57) ABSTRACT

The disclosure relates to a pre-5th-Generation (5G) or 5G communication system to be provided for supporting higher data rates Beyond 4th-Generation (4G) communication system such as Long Term Evolution (LTE). A method for communication of a constrained user equipment (UE) with a Message in Fifth Generation (MSGin5G) server providing a MSGin5G service in an IoT network is provided. The method includes receiving, by an unconstrained UE, a registration request comprises a security credential of the constrained UE from the constrained UE, where the unconstrained UE have access to the MSGin5G server and the constrained UE do not have access to the MSGin5G server. The method includes determining, by the unconstrained UE, whether the constrained UE is authorized based on the security credential. The method includes performing, by the unconstrained UE, a registration of the constrained UE with the unconstrained UE for communication of the constrained UE with the MSGin5G server based on authorization of the constrained UE.

14 Claims, 13 Drawing Sheets

(51) Int. Cl.
*H04W 12/06* (2021.01)
*H04W 60/04* (2009.01)
*H04W 60/06* (2009.01)

(58) Field of Classification Search
CPC ...... H04W 60/04; H04W 60/06; H04L 63/10; H04L 67/12
See application file for complete search history.

(56) References Cited

OTHER PUBLICATIONS

China Mobile, Pesudo-CR to remove EN in 6.11.1, S6-202068, 3GPP TSG-SA WG6 Meeting #40-e, Nov. 11, 2020, e-meeting.
International Search Report dated Apr. 11, 2022, issued in International Application No. PCT/KR2022/000579.
3rd Generation Partnership Project; Technical Specification Group Services and System Aspects; Study on support of the 5GMSG Service (Release 17), 3GPP TR 23.700-24 V0.7.0, Aug. 6, 2020.
Indian Office Action dated Oct. 25, 2022, issued in Indian Application No. 202141001466.
3rd Generation Partnership Project; Technical Specification Group Services and System Aspects; Message Service within the 5G System Stage 1 (Release 17), 3GPP TS 22.262 V17.0.0 (Sep. 2021), Sep. 1, 2021.
3rd Generation Partnership Project; Technical Specification Group Services and System Aspects; Study on support of the 5GMSG Service; (Release 17), 3GPP TR 23.700-24 V1.2.0, XP051965909, Dec. 3, 2020.
Huawei, Alignment on item names, S6-201273, 3GPP TSG-SA WG6 Meeting #38-e, XP051910248, Jul. 29, 2020, e-meeting.
European Search Report dated May 15, 2024, issued in European Application No. 22739684.3.

METHOD AND UNCONSTRAINED UE FOR COMMUNICATION OF CONSTRAINED UE WITH MSGIN5G SERVER

CROSS-REFERENCE TO RELATED APPLICATION(S)

This application is based on and claims priority under 35 U.S.C. § 119(a) of an Indian Provisional patent application number 202141001466, filed on Jan. 12, 2021, in the Indian Intellectual Property Office, and of an Indian Provisional patent application number 202141030562, filed on Jul. 7, 2021, in the Indian Intellectual Property Office, and of an Indian Complete patent application number 202141001466, filed on Dec. 8, 2021, in the Indian Intellectual Property Office, the disclosure of each of which is incorporated by reference herein in its entirety.

BACKGROUND

1. Field

The disclosure relates to wireless communication. More particularly, the disclosure relates to a method and an unconstrained User Equipment (UE) for communication of a constrained UE with a Message in Fifth Generation (MSGin5G) server providing a MSGin5G service in an Internet-of-Things (IoT) network.

2. Description of Related Art

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post Long Term Evolution (LTE) system'.

The 5G communication system is considered to be implemented in higher frequency (millimeter (mm) Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

$3^{rd}$ Generation Partnership Project (3GPP) is currently defining a messaging service in a $5^{th}$ Generation (5G) system called as MSGin5G service for Massive Internet of Things (MIoT) devices. The MSGin5G service enables various message communication models with advanced messaging service capabilities and performance over the 5G system. The MSGin5G service is designed and optimized for MIoT device communication including thing-to-thing communication and person-to-thing communication. Certain IoT devices such as sensors, activators, etc. usually have limitations in computation or storage or communication, and use batteries or small solar photovoltaic equipment, called as constrained UEs. Certain IoT devices such as a mobile, television, washing machine, refrigerator, etc. have advanced communication capabilities with sufficient storage, called as unconstrained UEs.

Existing systems for the MSgin5G service do not provide a method for exchange of messages between the constrained UEs and the unconstrained UEs. Moreover, the constrained UEs generally need a gateway User Equipment (UE) to communicate with a server. However, the existing systems do not specify a method for identifying and forwarding a received message to the constrained UE by the gateway UE upon receiving an MSGin5G message from the server. The constrained UEs support only low computational protocols such as Constrained Application Protocol (CoAP) for communication, whereas the unconstrained UEs with advanced capabilities use protocols such as Hyper-Text Transfer Protocol (HTTP) or Session Initiation Protocol (SIP) with more features support for communication. Due to using different communication protocols, a translation of the messages from one protocol to another protocol is required between the constrained UEs and the unconstrained UEs to enable communication between such UEs, which is not provided by the existing systems. Thus, it is desired to at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an unconstrained UE for communication of a constrained UE with a MSGin5G server providing a MSGin5G service in an IoT network.

Another aspect of the disclosure is to enable/disable the unconstrained UE as a message relay/gateway for the constrained UE for communicating with a messaging server based on a registration at the unconstrained UE even without using a Universal Subscriber Identity Module (USIM) at the constrained UE to connect to the messaging server.

Another aspect of the disclosure is to provide protocol translation within a messaging server for sending messages to the constrained UE via the unconstrained UE that does not support the communication protocol of the constrained UE.

Another aspect of the disclosure is to provide an application layer interface, i.e. MSGin5G-6 to enable application communication between the constrained UE and the unconstrained UE while the unconstrained UE operates as the message relay/gateway of the constrained UE.

Additional aspects will be set forth in part in the description which follows and, in part, will be apparent from the description, or may be learned by practice of the presented embodiments.

In accordance with an aspect of the disclosure, a method for communication of a constrained UE with a MSGin5G server providing a MSGin5G service in an IoT network is provided. The method includes receiving, by an unconstrained UE, a registration request comprises a security credential of the constrained UE from the constrained UE, where the unconstrained UE has access to the MSGin5G server and the constrained UE do not have access to the MSGin5G server, determining, by the unconstrained UE, whether the constrained UE is authorized based on the security credential, and performing, by the unconstrained UE, a registration of the constrained UE with the unconstrained UE for communication of the constrained UE with the MSGin5G server based on authorization of the constrained UE.

In an embodiment, the receiving, by the unconstrained UE, the registration request comprises security credentials of the constrained UE from the constrained UE, comprises identifying, by the constrained UE, that the unconstrained UE is connected to the MSGin5G server, and, sending, by the constrained UE, the registration request comprises the security credentials of the constrained UE to the unconstrained UE.

In an embodiment, the unconstrained UE and the constrained UE communicate each other through a MSGin5G-6 interface.

In an embodiment, the performing, by the unconstrained UE, the registration of the constrained UE with the unconstrained UE for communication of the constrained UE with the MSGin5G server based on authorization of the constrained UE, comprises determining, by the unconstrained UE, whether a local condition of the unconstrained UE to communicate with the MSGin5G server matches a threshold condition, and performing, by the unconstrained UE, one of discarding the registration request of the constrained UE, in response to determining that at least one of the constrained UE is not authorized based on the security credential, and the local condition of the unconstrained UE does not match to the threshold condition, and registering the constrained UE with the unconstrained UE by storing a mapping between information of the constrained UE and a layer-2 ID of the constrained UE, and enabling a gateway functionality of the unconstrained UE to operate the unconstrained UE as a gateway device for communication of the constrained UE with the MSGin5G server, in response to determining that the constrained UE is authorized based on the security credential, and the local condition of the unconstrained UE matches the threshold condition, and sending, by the unconstrained UE, a registration response to the constrained UE.

In an embodiment, the information of constrained UE comprises an application Identity (ID) of an application client on the constrained UE.

In an embodiment, the local condition comprises at least one of an available power at the unconstrained UE and a network connectivity to access the MSGin5G server.

In an embodiment, the sending, by the unconstrained UE, the registration response to the constrained UE, comprises sending, by the unconstrained UE, a registration success response to the constrained UE, in response to registering the constrained UE with the unconstrained UE, and sending, by the unconstrained UE, a registration failure response to the constrained UE, in response to discarding the registration request of the constrained UE.

In an embodiment, the method further includes receiving, by the unconstrained UE, a deregistration request from the constrained UE, where the constrained UE is registered to the unconstrained UE, performing, by the unconstrained UE, deregistration of the constrained UE with the unconstrained UE by removing the mapping between the information of the constrained UE and the layer-2 ID of the constrained UE, sending, by the unconstrained UE, a deregistration response to the constrained UE, and includes disabling, by the unconstrained UE, the gateway functionality of the unconstrained UE when none of registered devices are using the unconstrained device as the gateway device.

In an embodiment, the method further includes receiving, by the unconstrained UE, a request for sending a MSGin5G message to the MSGin5G server from the constrained UE, determining, by the unconstrained UE, whether the local condition of the unconstrained UE to communicate with the MSGin5G server matches a threshold condition, performing, by the unconstrained UE, one of sending the MSGin5G message as one of a point-to-point message and a group message to the MSGin5G server, in response to determining that the local condition of the unconstrained UE matches the threshold condition, and discarding the request for sending the MSGin5G message to the MSGin5G server and sending a failure response to the constrained UE, in response to determining that the local condition of the unconstrained UE does not match to the threshold condition, and includes sending, by the unconstrained UE, a response of sending the MSGin5G message to the constrained UE.

In an embodiment, the sending, by the unconstrained UE, the response of sending the MSGin5G message to the constrained UE, comprises sending, by the unconstrained UE, a success response of sending the MSGin5G message to the constrained UE, in response to sending the MSGin5G message to the MSGin5G server and sending, by the unconstrained UE, a failure response of sending the MSGin5G message to the constrained UE, in response to discarding the request for sending the MSGin5G message to the MSGin5G server.

In an embodiment, the local condition comprises at least one of available power at the unconstrained UE, network connectivity to access the MSGin5G server, a maximum allowed packet size of the MSGin5G message.

In an embodiment, the method further includes receiving, by the unconstrained UE, a delivery report from the MSGin5G server, when a delivery status is enabled while sending the MSGin5G message to the MSGin5G server, and sending, by the unconstrained UE, the delivery report to the constrained UE.

In an embodiment, the method further includes receiving, by the unconstrained UE, one of a group message, a point-to-point message, and an application-to-point message from the MSGin5G server, performing, by the unconstrained UE, reassembly of the received message when the received message is segmented, where the unconstrained UE performs a segment recovery of the received message when at least one segment is missing in the received message, sending, by the unconstrained UE, a MSGin5G message received request to the constrained UE, where the MSGin5G message received request comprises an originator address, a group ID, a payload of the received message, a delivery status, and a priority type, and receiving, by the unconstrained UE, a message received response from the constrained UE when the MSGin5G message received request is received at the constrained UE.

In an embodiment, the method further includes receiving, by the unconstrained UE, a message delivery status from the constrained UE, when a delivery status is enabled in the MSGin5G message received request and the MSGin5G message received request is received at the constrained UE. The method includes sending, by the unconstrained UE, a delivery report to the MSGin5G server.

In accordance with another aspect of the disclosure, a method for communication of the constrained UE with the MSGin5G server providing the MSGin5G service in the IoT network is provided. The method includes receiving, by the unconstrained UE having access to the MSGin5G server, a registration request from the constrained UE, where the registration request comprises the security credential required for the constrained UE to register to the MSGin5G server, determining, by the unconstrained UE, the local condition at the unconstrained UE for accepting or rejecting the received registration request, and performing, by the unconstrained UE, a registration for the constrained UE with the MSGin5G server when the registration request is accepted based on the local condition.

In an embodiment, the local condition comprises at least one of an available power at the unconstrained UE, and a network connectivity to access the MSGin5G server.

In an embodiment, the method further includes accepting, by the MSGin5G server, the registration request from the unconstrained UE on behalf of the constrained UE based on the received security credential, and storing, by the MSGin5G server, a mapping of the unconstrained UE acting as a gateway device to the constrained UE.

In an embodiment, the method further includes sending, by the unconstrained UE, a registration response message to the constrained UE indicating success or failure of the registration with the MSGin5G server, where the registration response message comprises a reason for registration failure in case of the failure of the registration, where the registration response message comprises a MSGin5G service ID in case of the success of the registration In an embodiment, the unconstrained UE has capability to communicate with the MSGin5G server, whereas the constrained UE do not have capability to communicate with the MSGin5G server.

In an embodiment, the MSGin5G server includes a protocol conversion function to convert a first protocol format used for communication by the unconstrained UE into a second protocol format used for communication by the constrained UE.

In an embodiment, the method further includes receiving, by the unconstrained UE, a request from the constrained UE for sending a MSGin5G message to the MSGin5G server, determining, by the unconstrained UE, the local condition at the unconstrained UE for sending or rejecting the received request for sending a MSGin5G message to the MSGin5G server, and sending, by the unconstrained UE, the MSGin5G message from the constrained UE to the MSGin5G server based on the local condition.

In an embodiment, the method further includes sending, by the unconstrained UE, a response message to the constrained UE indicates a successful transmission of the MSGin5G message to the MSGin5G server or rejection of the received request.

In an embodiment, the method further includes sending, by the unconstrained UE, a delivery report message to the constrained UE comprising an indication of successfully receiving the MSGin5G message from the constrained UE.

In an embodiment, the method further includes receiving, by the unconstrained UE, a request from the MSGin5G server to send a MSGin5G message to the constrained UE, and sending, by the unconstrained UE, the MSGin5G message received from the MSGin5G server to the constrained UE.

In an embodiment, the method further includes sending, by the constrained UE, a response message comprising acceptance or rejection of the MSGin5G message request to the MSGin5G server through the unconstrained UE.

In an embodiment, the method further includes sending, by the constrained UE, a delivery report of the MSGin5G message to the MSGin5G server through the unconstrained UE.

In an embodiment, the MSGin5G message is a point-to-point message or a group message.

In an embodiment, the method further includes receiving, by the unconstrained UE, a deregistration request from the constrained UE, where the constrained UE is registered, where the constrained UE is registered with the MSGin5G server, performing, by the unconstrained UE, a deregistration for the constrained UE with the MSGin5G server, where the MSGin5G server removes the mapping of the unconstrained UE acting as the gateway device to the constrained UE, receiving, by the unconstrained UE, a response from the MSGin5G server, and sending, by the unconstrained UE, a response for the deregistration request to the constrained UE indicating success or failure of the deregistration based on the response received from the MSGin5G server.

In accordance with another aspect of the disclosure, an unconstrained UE for communication of the constrained UE with the MSGin5G server providing the MSGin5G service in the IoT network is provided. The unconstrained UE includes a memory, a processor, and a gateway controller, coupled to the memory and the processor. The gateway controller is configured to receive a registration request comprises a security credential of the constrained UE from the constrained UE, where the unconstrained UE has access to the MSGin5G server and the constrained UE does not have access to the MSGin5G server, to determine whether the constrained UE is authorized based on the security credential, and to perform a registration of the constrained UE with the unconstrained UE for communication of the constrained UE with the MSGin5G server based on the authorization of the constrained UE.

In accordance with another aspect of the disclosure, an unconstrained UE for communication of the constrained UE with the MSGin5G server providing the MSGin5G service in the IoT network is provided. The unconstrained UE includes the memory, the processor, and the gateway controller, coupled to the memory and the processor. The gateway controller is configured to receive the registration request from the constrained UE, where the registration request comprises the security credential required for the constrained UE to register to the MSGin5G server. The gateway controller is configured for determining the local condition at the unconstrained UE for accepting or rejecting the received registration request. The gateway controller is configured for performing the registration for the constrained UE with the MSGin5G server when the registration request is accepted based on the local condition.

Other aspects, advantages, and salient features of the disclosure will become apparent to those skilled in the art from the following detailed description, which, taken in conjunction with the annexed accompanying drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
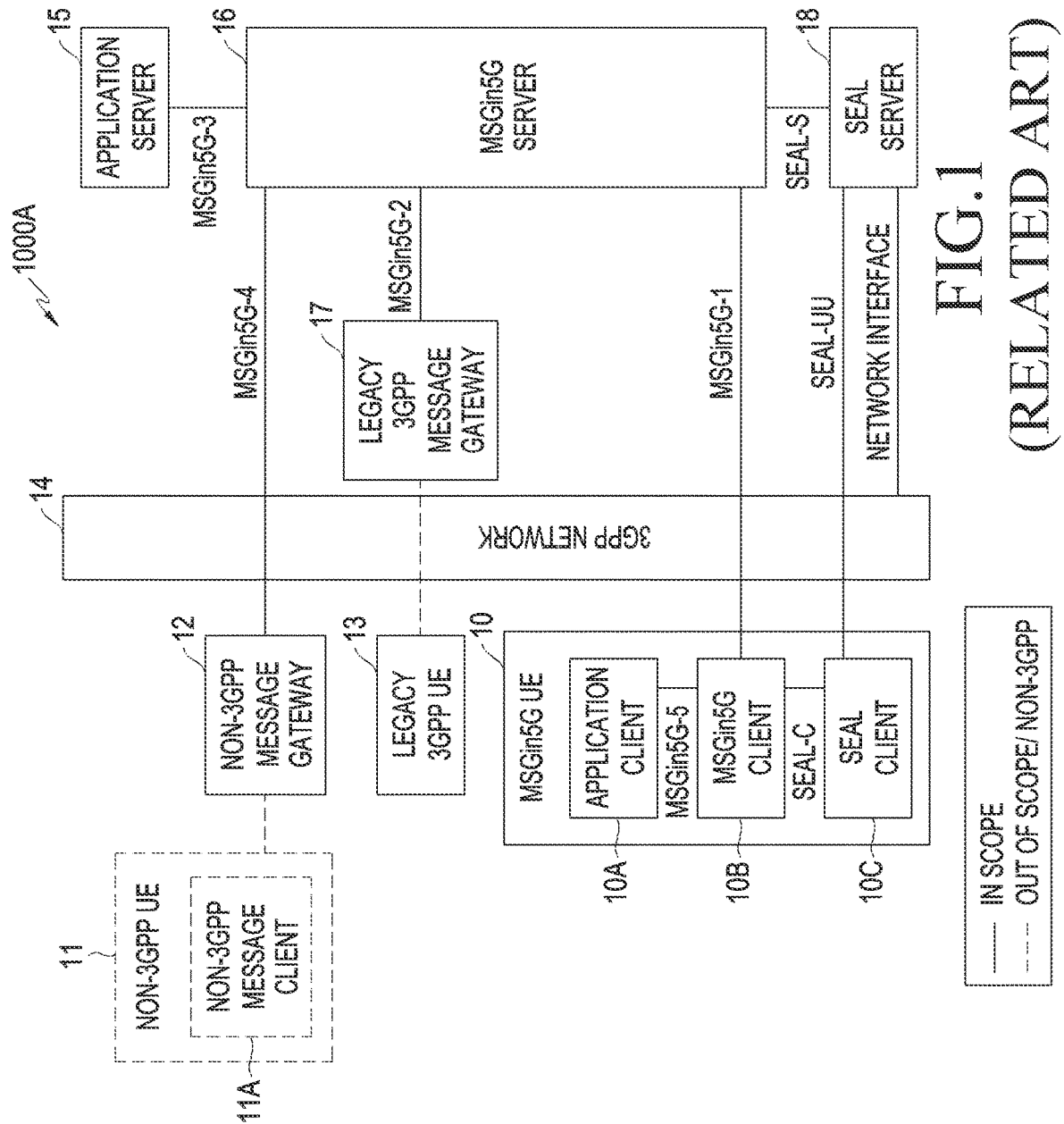
FIG. 1 illustrates an existing architecture of a system for providing a MSGin5G service, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

FIG. 1 illustrates an existing architecture of a system (1000A) for providing a MSGin5G service, according to the related art.

Referring to FIG. 1, the existing architecture is defined as specified in a 3GPP Technical Report (TR) 23.700-24 V1.2.0. The MSGin5G service shall fulfil the service requirements which are enumerated in a 3GPP Technical Specification (TS) 22.262. The system (1000A) includes a MSGin5G UE (10) which is an unconstrained UE, a non-3GPP UE (11) including a non-3GPP message client 11A, a legacy 3GPP UE (13), an application server (15), a MSGin5G server (16), a Service Enabler Architecture Layer (SEAL) server (18). The application server (15) and the MSGin5G server (16) communicate with each other via a MSGin5G-3 interface. The SEAL server (18) and the MSGin5G server (16) communicate with each other via a SEAL-S interface specified for each SEAL service. A non-3GPP message gateway (12) connects the non-3GPP UE (11) to the MSGin5G server (16) over a 3GPP network (14) via a MSGin5G-4 interface. A legacy 3GPP message gateway (17) connects the legacy 3GPP UE (13) to the MSGin5G server (16) over the 3GPP network (14) via a MSGin5G-2 interface.

The MSGin5G UE (10) includes an application client (10A), a MSGin5G client (10B), and a SEAL client (10C), where the application client (10A) and the MSGin5G client (10B) communicate each other via a MSGin5G-5 interface, and the MSGin5G client (10B) and the SEAL client (10C) communicate each other via a SEAL-C interface specified for each SEAL service. The MSGin5G client (10B) and the MSGin5G server (16) communicate with each other over the 3GPP network (14) via a MSGin5G-1 interface. A SEAL client (10C) and the SEAL server (18) communicate with each other over the 3GPP network (14) via a SEAL-UU interface as specified in a 3GPP TS 23.434. The 3GPP network and the SEAL server (18) communicate with each other via a network interface.

Throughout this disclosure, the terms "messaging server", and "MSGin5G server" are used interchangeably and mean the same. Throughout this disclosure, the terms "interface", and "reference point" are used interchangeably and mean the same. Throughout this disclosure, the terms "unconstrained UE (100)", and "MSGin5G UE (100)" are used interchangeably and mean the same. Throughout this disclosure, the terms "constrained UE (200)", and "MSGin5G UE (200)" are used interchangeably and mean the same.

Accordingly, the embodiments herein provide a method for communication of a constrained UE with a MSGin5G server providing a MSGin5G service in an IoT network. The method includes receiving, by an unconstrained UE, a registration request comprises a security credential of the constrained UE from the constrained UE, where the unconstrained UE has access to the MSGin5G server and the constrained UE do not have access to the MSGin5G server. The method includes determining, by the unconstrained UE, whether the constrained UE is authorized based on the security credential. The method includes performing, by the unconstrained UE, a registration of the constrained UE with the unconstrained UE for communication of the constrained UE with the MSGin5G server based on authorization of the constrained UE.

Accordingly, the embodiments herein provide a method for communication of the constrained UE with the MSGin5G server providing the MSGin5G service in the IoT network. The method includes receiving, by the unconstrained UE having access to the MSGin5G server, a registration request from the constrained UE, where the registration request comprises the security credential required for the constrained UE to register to the MSGin5G server. The method includes determining, by the unconstrained UE, the local condition at the unconstrained UE for accepting or rejecting the received registration request. The method includes performing, by the unconstrained UE, a registration for the constrained UE with the MSGin5G server when the registration request is accepted based on the local condition.

Accordingly, the embodiments herein provide the unconstrained UE for communication of the constrained UE with the MSGin5G server providing the MSGin5G service in the IoT network. The unconstrained UE comprising a memory, a processor, and a gateway controller, coupled to the memory and the processor. The gateway controller is configured for receiving a registration request comprises a security credential of the constrained UE from the constrained UE, where the unconstrained UE have access to the MSGin5G server and the constrained UE do not have access to the MSGin5G server. The gateway controller is configured for determining whether the constrained UE is authorized based on the security credential. The gateway controller is configured for performing a registration of the constrained UE with the unconstrained UE for communication of the constrained UE with the MSGin5G server based on authorization of the constrained UE.

Accordingly, the embodiments herein provide the unconstrained UE for communication of the constrained UE with the MSGin5G server providing the MSGin5G service in the IoT network. The unconstrained UE comprising the memory, the processor, and the gateway controller, coupled to the memory and the processor. The gateway controller is configured for receiving the registration request from the constrained UE, where the registration request comprises the security credential required for the constrained UE to register to the MSGin5G server. The gateway controller is configured for determining the local condition at the unconstrained UE for accepting or rejecting the received registration request. The gateway controller is configured for performing the registration for the constrained UE with the MSGin5G server when the registration request is accepted based on the local condition.

Unlike existing methods and systems, the unconstrained UE can enable/disable its message relay/gateway functionality that controls communication between the constrained UE and the messaging server even without using a Universal Subscriber Identity Module (USIM) at the constrained UE to connect to the messaging server, based on a registration of the constrained UE at the unconstrained UE. Therefore, resources of the unconstrained UE can be efficiently utilized by controlling an access of the unconstrained UE over the resources.

Unlike existing methods and systems, the proposed method allows protocol translation within the messaging server for sending messages to the constrained UE via the unconstrained UE that does not support the communication protocol of the constrained UE, which enables seamless communication between the constrained UE and the messaging server.

Unlike existing methods and systems, a proposed architecture of a system for providing the MSGin5G service includes an application layer interface, i.e. MSGin5G-6 interface, to enable application communication between the constrained UE and the unconstrained UE while the unconstrained UE operates as a message relay/gateway device of the constrained UE.

Referring now to the drawings, and more particularly to FIGS. 2 through 13, there are shown preferred embodiments.

Figure 2:
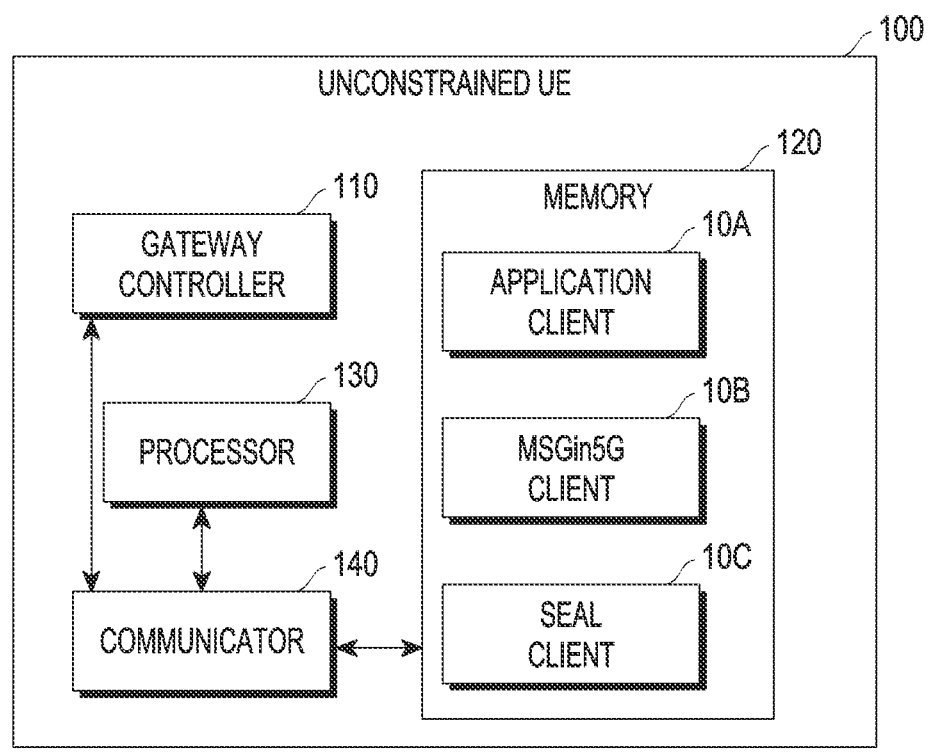
FIG. 2 is a block diagram of an unconstrained UE for communication of a constrained user equipment (UE) with a Message in Fifth Generation (MSGin5G) server for providing messages using the MSGin5G service, according to an embodiment of the disclosure.

FIG. 2 is a block diagram of an unconstrained UE (100) for communication of a constrained UE (200) with a MSGin5G server (16) for providing messages using the MSGin5G service, according to an embodiment of the disclosure.

Referring to FIG. 2, an electronic device that has limitation in computation and storage, and use batteries or small solar photovoltaic equipment, is called a constrained UE (200). Examples of the constrained UE (200) include, but not limited to sensors, activators, etc. An electronic device that has advanced communication capabilities with sufficient storage, called as the unconstrained UE (100). Examples of the unconstrained UE (100) include, but not limited to a smartphone, a tablet computer, a personal digital assistance (PDA), a desktop computer, an IoT device, etc. The unconstrained UE (100) have access to the MSGin5G server (16) and the constrained UE (200) do not have access to the MSGin5G server (16). i.e. the unconstrained UE (100) can communicate with the MSGin5G server (16), whereas the constrained UE (200) cannot communicate with the MSGin5G server (16). In an embodiment, the unconstrained UE (100) and the constrained UE (200) communicate with each other through a MSGin5G-6 interface. In an embodiment, the MSGin5G server (16) includes a protocol conversion function to convert a first protocol format used for communication by the unconstrained UE (100) into a second protocol format used for communication by the constrained UE (200).

Referring to FIG. 2, in an embodiment, the unconstrained UE (100) includes a gateway controller (110), a memory (120), a processor (130), and a communicator (140). The gateway controller (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The constrained UE (200) identifies that the unconstrained UE (100) is connected to the MSGin5G server (16). Further, the constrained UE (200) sends a registration request comprises security credentials of the constrained UE (200) to the unconstrained UE (100). The gateway controller (110) receives a registration request comprises the security credential of the constrained UE (200) from the constrained UE (200). The gateway controller (110) determines whether the constrained UE (200) is authorized based on the security credential. The gateway controller (110) performs a registration of the constrained UE (200) with the unconstrained UE (100) for communication of the constrained UE (200) with the MSGin5G server (16) based on authorization of the constrained UE (200).

In an embodiment, the gateway controller (110) determines whether a local condition of the unconstrained UE (100) to communicate with the MSGin5G server (16) matches a threshold condition. In an embodiment, the local condition comprises an available power at the unconstrained UE (100) and/or a network connectivity to access the MSGin5G server (16). The gateway controller (110) discards the registration request of the constrained UE (200), in response to determining that at least one of the constrained UE (200) is not authorized based on the security credential, and the local condition of the unconstrained UE (100) does not match to the threshold condition. The gateway controller (110) registers the constrained UE (200) with the unconstrained UE (100) by storing a mapping between information of the constrained UE (200) and a layer-2 ID of the constrained UE (200), and enabling a gateway functionality of the unconstrained UE (100) to operate the unconstrained UE (100) as a gateway device for communication of the constrained UE (200) with the MSGin5G server (16), in response to determining that the constrained UE (200) is authorized based on the security credential, and the local condition of the unconstrained UE (100) matches the threshold condition. An example for the information of the constrained UE (200) is an application Identity (ID) of an application client (20A) on the constrained UE (200).

The gateway controller (110) sends a registration response to the constrained UE (200). In an embodiment, the gateway controller (110) sends a registration success response to the constrained UE (200), in response to registering the constrained UE (200) with the unconstrained UE (100). In an embodiment, the gateway controller (110) sends a registration failure response to the constrained UE (200), in response to discarding the registration request of the constrained UE (200).

Upon registering the constrained UE (200) to the unconstrained UE (100), the gateway controller (110) may receive a deregistration request from the constrained UE (200) when the constrained UE (200) wants to discontinue the registration at the unconstrained UE (100). The gateway controller (110) performs a deregistration of the constrained UE (200) with the unconstrained UE (100) by removing the mapping between the information of the constrained UE (200) and the layer-2 ID of the constrained UE (200). The gateway controller (110) sends a deregistration response to the constrained UE (200) and disables the gateway functionality of the unconstrained UE (100) when none of registered devices are using the unconstrained device as a gateway device.

Upon registering the constrained UE (200) to the unconstrained UE (100), the gateway controller (110) may receive a request for sending a MSGin5G message to the MSGin5G server (16) from the constrained UE (200). Further, the gateway controller (110) determines whether the local condition of the unconstrained UE (100) to communicate with the MSGin5G server (16) matches the threshold condition. In another embodiment, the local condition comprises the available power at the unconstrained UE (100), and/or the network connectivity to access the MSGin5G server (16), and/or a maximum allowed packet size of the MSGin5G message. The gateway controller (110) sends the MSGin5G message as one of a point-to-point message and a group message to the MSGin5G server (16), in response to determining that the local condition of the unconstrained UE (100) matches the threshold condition. The gateway controller (110) discards the request for sending the MSGin5G message to the MSGin5G server (16), and sends a registration failure response to the constrained UE (200), in response to determining that the local condition of the unconstrained UE (100) does not match to the threshold condition.

The gateway controller (110) sends a response of sending the MSGin5G message to the constrained UE (200). In an embodiment, the gateway controller (110) sends a success response of sending the MSGin5G message to the constrained UE (200), in response to sending the MSGin5G message to the MSGin5G server (16). In another embodiment, the gateway controller (110) sends a failure response of sending the MSGin5G message to the constrained UE (200), in response to discarding the request for sending the MSGin5G message to the MSGin5G server (16).

Upon sending the response of sending the MSGin5G message to the constrained UE (200), the gateway controller (110) may receive a delivery report from the MSGin5G server (16), when a delivery status is enabled while sending the MSGin5G message to the MSGin5G server (16). Further, the gateway controller (110) sends the delivery report to the constrained UE (200).

Upon registering the constrained UE (200) to the unconstrained UE (100), the gateway controller (110) may receive one of a group message, a point-to-point message, and an application-to-point message from the MSGin5G server (16). Further, the gateway controller (110) performs a reassembly of the received message when the received message is segmented, where the unconstrained UE (100) performs a segment recovery of the received message when at least one segment is missing in the received message. Further, the gateway controller (110) sends a MSGin5G message received request to the constrained UE (200), where the MSGin5G message received request comprises an originator address, a group ID, a payload of the received message, a delivery status, and a priority type. Further, the gateway controller (110) receives a message received response from the constrained UE (200) when the MSGin5G message received request is received at the constrained UE (200). Further, the gateway controller (110) may receive a message delivery status from the constrained UE (200), when a delivery status is enabled in the MSGin5G message received request and the MSGin5G message received request is received at the constrained UE (200). Further, the gateway controller (110) sends a delivery report to the MSGin5G server (16).

In another embodiment, the gateway controller (110) receives a registration request from the constrained UE (200), where the registration request comprises the security credential required for the constrained UE (200) to register to the MSGin5G server (16). Further, the gateway controller (110) determines the local condition at the unconstrained UE (100) for accepting or rejecting the received registration request. Further, the gateway controller (110) performs registration for the constrained UE (200) with the MSGin5G server (16) when the registration request is accepted based on the local condition. Further, the MSGin5G server (16) accepts the registration request from the unconstrained UE (100) on behalf of the constrained UE (200) based on the received security credential. Further, the MSGin5G server (16) stores a mapping of the unconstrained UE (100) acting as the gateway device to the constrained UE (200).

Upon registering the constrained UE (200) with the MSGin5G server (16), the gateway controller (110) may send a registration response message to the constrained UE (200) indicating success or failure of the registration with the MSGin5G server (16), where the registration response message comprises a reason for registration failure in case of the failure of the registration, and the registration response message comprises a MSGin5G service ID in case of the success of the registration.

Upon registering the constrained UE (200) with the MSGin5G server (16), the gateway controller (110) may receive a request from the constrained UE (200) for sending a MSGin5G message to the MSGin5G server (16), where the MSGin5G message is one of a point-to-point message or a group message. Further, the gateway controller (110) determines the local condition at the unconstrained UE (100) for sending or rejecting the received request to the MSGin5G server (16). Further, the gateway controller (110) sends the MSGin5G message from the constrained UE (200) to the MSGin5G server (16) based on the local condition. Further, the gateway controller (110) sends a response message to the constrained UE (200) indicates a successful transmission of the MSGin5G message to the MSGin5G server (16) or rejection of the received request. Further, the gateway controller (110) sends a delivery report message to the constrained UE (200) comprising an indication of successfully receiving the MSGin5G message from the constrained UE (200).

Upon registering the constrained UE (200) with the MSGin5G server (16), the gateway controller (110) may receive a request from the MSGin5G server (16) to send a MSGin5G message to the constrained UE (200). Further, the gateway controller (110) sends the MSGin5G message received from the MSGin5G server (16) to the constrained UE (200). Further, the constrained UE (200) sends a response message comprising acceptance or rejection of the MSGin5G message request to the MSGin5G server (16) through the unconstrained UE (100). Further, the constrained UE (200) a delivery report of the MSGin5G message to the unconstrained UE (100).

Upon registering the constrained UE (200) with the MSGin5G server (16), the gateway controller (110) may receive a deregistration request from the constrained UE (200). Further, the gateway controller (110) performs deregistration for the constrained UE (200) with the MSGin5G server (16), where the MSGin5G server (16) removes the mapping of the unconstrained UE (100) acting as the gateway device to the constrained UE (200). Further, the gateway controller (110) receives a response from the MSGin5G server (16). Further, the gateway controller (110) sends a response for the deregistration request to the constrained UE (200) indicating success or failure of the deregistration based on the response received from the MSGin5G server (16).

The memory (120) stores mapping of the security credential, and mapping of the unconstrained UE (100) acting as the gateway device to the constrained UE (200). The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the unconstrained UE (100), a cloud storage, or any other type of external storage. In an embodiment, an application client (10A), a MSGin5G client (10B), and a SEAL client (10C) of the unconstrained UE (100) is residing in the memory (120), where the gateway controller (110) is configured for performing the proposed operations using at least one of the application client (10A), the MSGin5G client (10B), and the SEAL client (10C).

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the unconstrained UE (100). Further, the communicator (140) is configured to facilitate the communication between the unconstrained UE (100) and other devices (e.g., constrained UE (200), MSGin5G server (16)) via one or more networks (e.g., Radio technology). The communicator (140) includes an electronic circuit specific to a standard that enables wired or wireless communication.

Although FIG. 2 shows the hardware components of the unconstrained UE (100) but it is to be understood that other embodiments are not limited thereon. In other embodiments, the unconstrained UE (100) may include less or more components. Further, the labels or names of the components are used only for illustrative purpose and does not limit the scope of the disclosure. One or more components can be combined together to perform same or substantially similar function for communication of the constrained UE (200) with the MSGin5G server (16).

Figure 3:
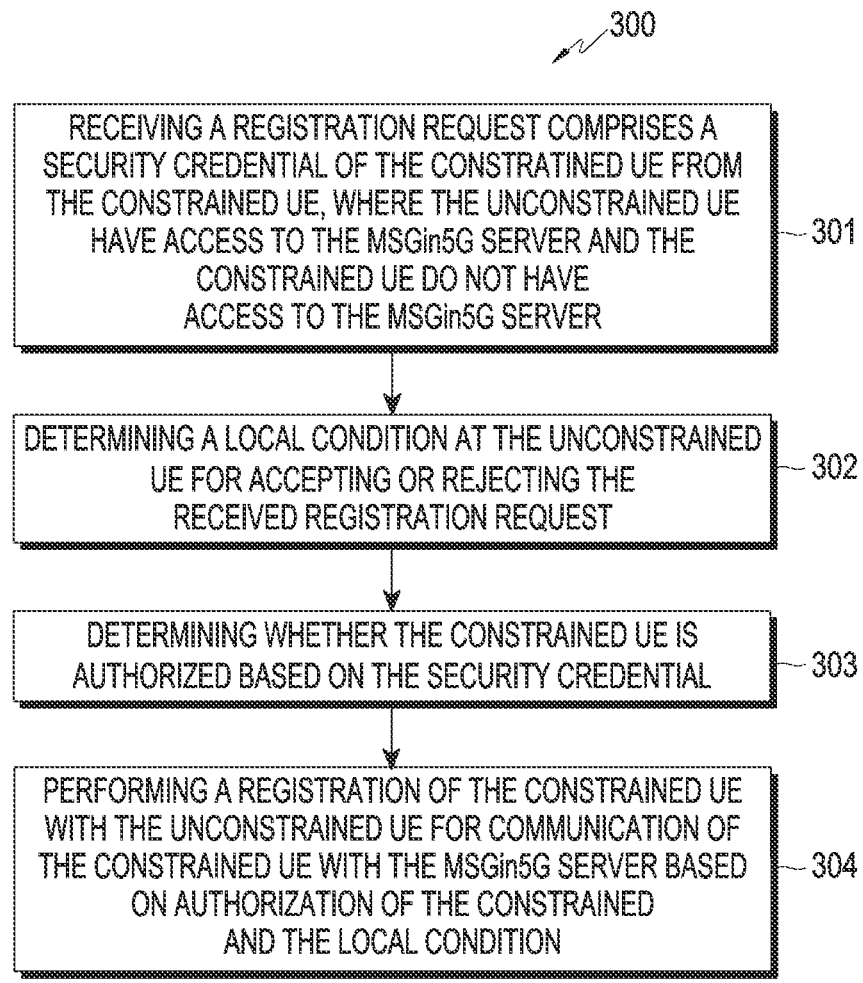
FIG. 3 is a flow diagram illustrating a method for communication of the constrained UE with the MSGin5G server by registering the constrained UE at the unconstrained UE according to an embodiment of the disclosure.

FIG. 3 is a flow diagram (300) illustrating a method for communication of the constrained UE (200) with the MSGin5G server (16) by registering the constrained UE (200) at the unconstrained UE (100), according to an embodiment of the disclosure.

Referring to FIG. 3, in an embodiment, the method allows the gateway controller (110) to perform operations 301 through 304 of the flow diagram (300). At operation 301, the method includes receiving the registration request comprises the security credential of the constrained UE (200) from the constrained UE (200), where the unconstrained UE (100) have access to the MSGin5G server (16) and the constrained UE (200) do not have access to the MSGin5G server (16). At operation 302, the method includes determining the local condition at the unconstrained UE (100) for accepting or rejecting the received registration request. At operation 303, the method includes determining whether the constrained UE (200) is authorized based on the security credential. At operation 304, the method includes performing the registration of the constrained UE (200) with the unconstrained UE (100) for communication of the constrained UE (200) with the MSGin5G server (16) based on authorization of the constrained UE (200) and the local condition.

Figure 4:
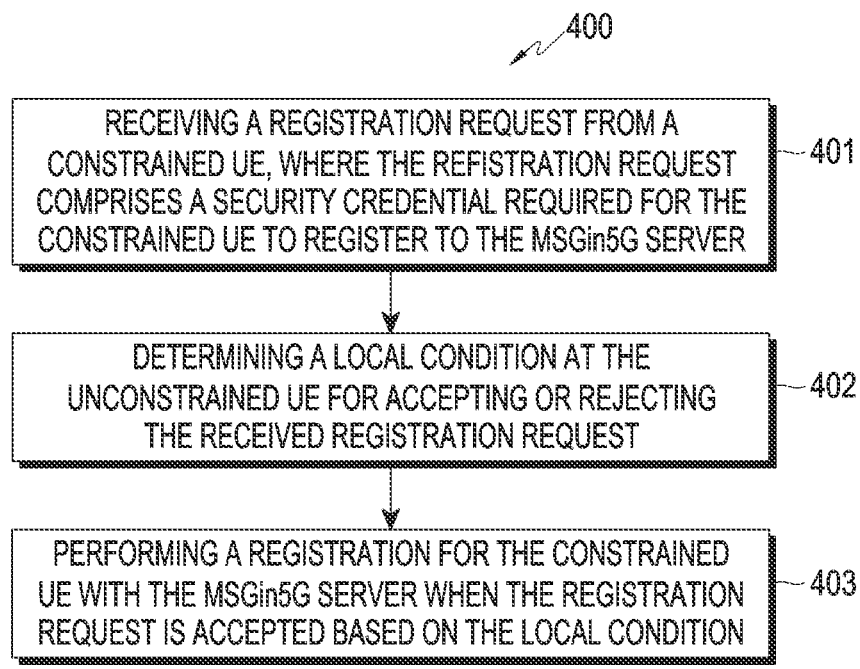
FIG. 4 is a flow diagram illustrating a method for communication of the constrained UE with the MSGin5G server by registering the constrained UE at the MSGin5G server, according to an embodiment of the disclosure.

FIG. 4 is a flow diagram (400) illustrating a method for communication of the constrained UE (200) with the MSGin5G server (16) by registering the constrained UE (200) at the MSGin5G server (16), according to an embodiment of the disclosure.

Referring to FIG. 4, in an embodiment, the method allows the gateway controller (110) to perform operations 401-403 of the flow diagram (400). At operation 401, the method includes receiving the registration request from the constrained UE (200), where the registration request comprises the security credential required for the constrained UE (200) to register to the MSGin5G server (16). At operation 402, the method includes determining the local condition at the unconstrained UE (100) for accepting or rejecting the received registration request. At operation 403, the method includes performing the registration for the constrained UE (200) with the MSGin5G server (16) when the registration request is accepted based on the local condition.

The various actions, acts, blocks, operations, or the like in the flow diagrams (300, 400) may be performed in the order presented, in a different order or simultaneously. Further, in some embodiments, some of the actions, acts, blocks, operations, or the like may be omitted, added, modified, skipped, or the like without departing from the scope of the disclosure.

Figure 5:
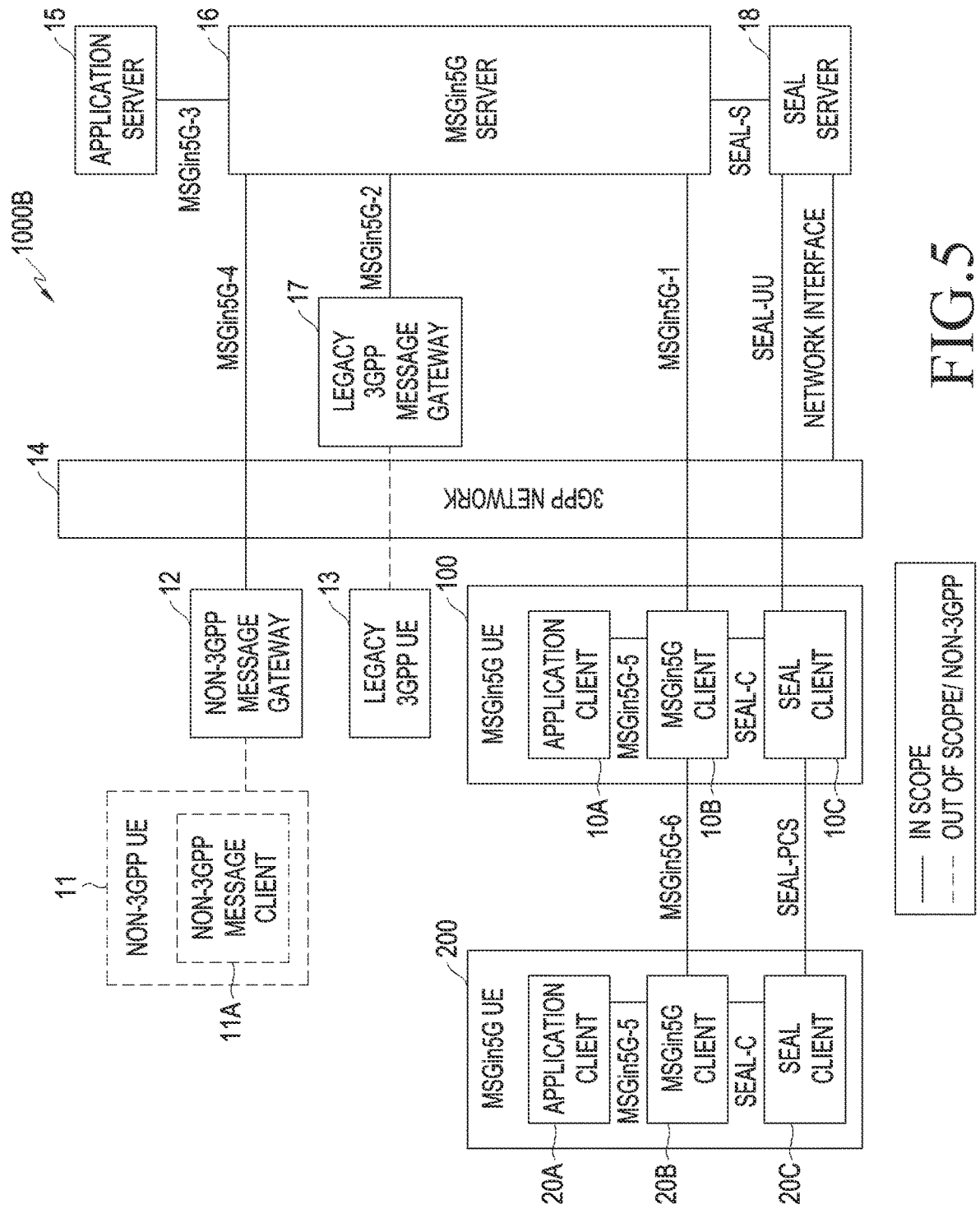
FIG. 5 illustrates a proposed architecture of the system for providing the MSGin5G service, according to an embodiment of the disclosure.

FIG. 5 illustrates a proposed architecture of the system (1000B) for providing the MSGin5G service, according to an embodiment of the disclosure.

Referring to FIG. 5, in addition to the system (1000A) described in the FIG. 1, the proposed system (1000B) contains the MSGin5G UE (200) that does not have enough capability to communicate with the MSGin5G server (16). The MSGin5G UE (100) has advanced capabilities and can communicate with the MSGin5G server (16) over the MSGin5G-1 interface. In an embodiment, the MSGin5G UE (200) includes an application client (20A), a MSGin5G client (20B), and a SEAL client (20C). The application client (20A) and the MSGin5G client (20B) communicate each other using a MSGin5G-5 interface. The SEAL client (20C) and the MSGin5G client (20B) communicate with each other using a SEAL-C interface. The MSGin5G client (20B) and the MSGin5G client (10B) communicate with each other through the MSGin5G-6 interface for enabling/disabling the MSGin5G UE (100) as the gateway device for the MSGin5G UE (200). The SEAL client (20C) and the SEAL client (10C) communicate with each other through the SEAL-PCS interface.

If allowed by configuration, the MSGin5G UE (100) operates as the message gateway device to the MSGin5G UE (200). In certain deployment options, a group management function based on a SEAL group management server specified in 3GPP TS 23.434 can be implemented in the MSGin5G server (16). The MSGin5G service supports both the MSGin5G UEs (100, 200). Both the MSGin5G UEs (100, 200) may support different protocols. A protocol conversion function of the Msgin5G server (16) converts one protocol format (e.g. CoAP) into another protocol format (e.g. HTTP) or vice versa.

Figure 6:
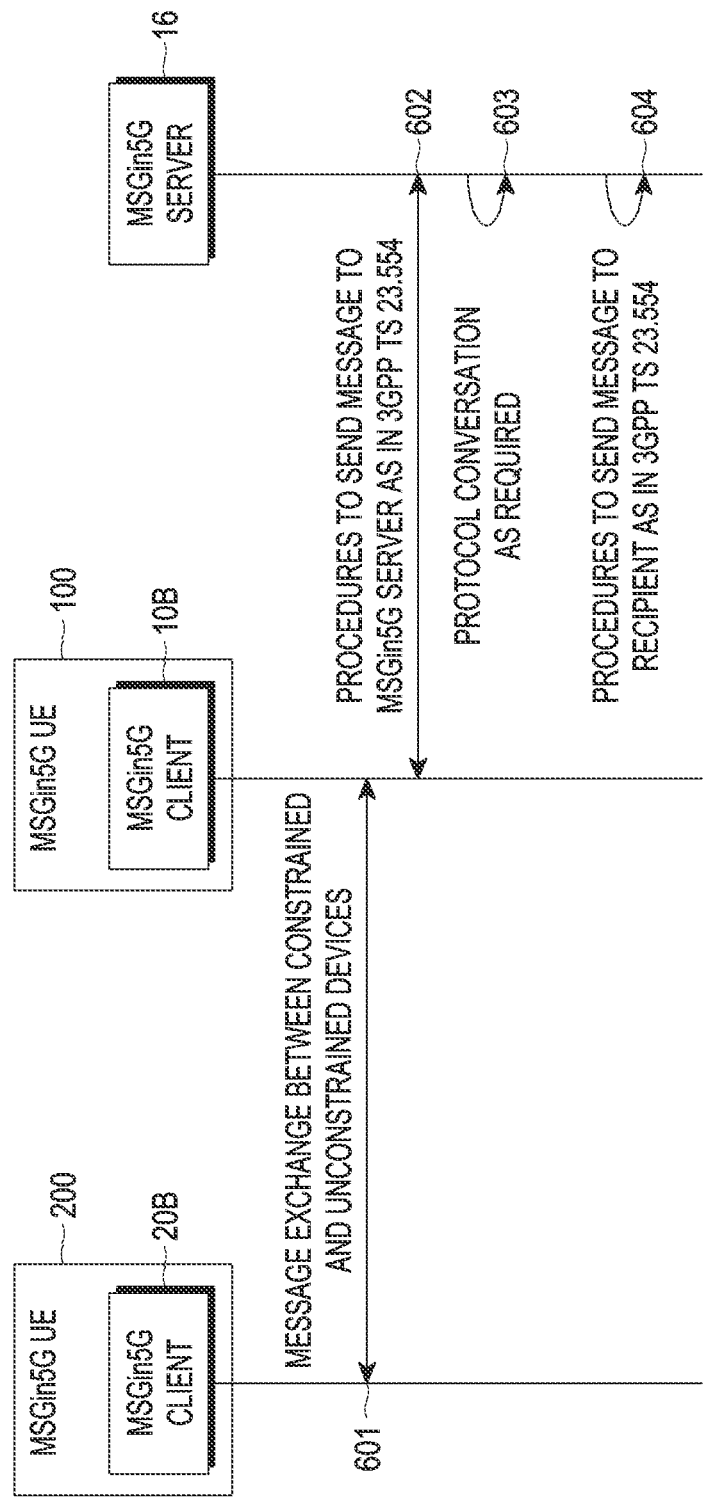
FIG. 6 is a signaling diagram illustrating communication between the constrained device, the unconstrained device, and the MSGin5G server for communicating a message using protocol translation, according to an embodiment of the disclosure.

FIG. 6 is a signaling diagram illustrating communication between the constrained device (200), the unconstrained UE (100), and the MSGin5G server (16) for communicating a message using protocol translation, according to an embodiment of the disclosure.

Referring to FIG. 6, consider, the MSGin5G UE (100) is connected to an access network (i.e. the IoT network) that provides connectivity to the MSGin5G server (16). The MSGin5G UE (200) does not have a connection to the access network that provides connectivity to the MSGin5G server (16). The MSGin5G client (20B) has been configured with the MSGin5G server identity. The MSGin5G server (16) has been configured with necessary credentials to enable authenticating the MSGin5G client (20B). The MSGin5G UE (200) has discovered the MSGin5G UE (100) having connectivity to the MSGin5G server (16), and have mutually authenticated each other. At operation 601, the MSGin5G UE (200) communicates with the MSGin5G UE (100) to register with the MSGin5G server (16), and further to send or receive point-to-point, group, point-to-application, or application-to-point messages. At operation 602, the MSGin5G UE (100) sends the received message to the MSGin5G server (16) as specified in 3GPP TS 23.554. At operation 603, the MSGin5G server (16) checks that intended recipient of the message requires a different protocol based on registration information or any other available information, and thus performs protocol conversion with help of the protocol conversion function. At operation 604, the MSGin5G server (16) sends the message to the intended recipient as specified in 3GPP TS 23.554.

Figure 7:
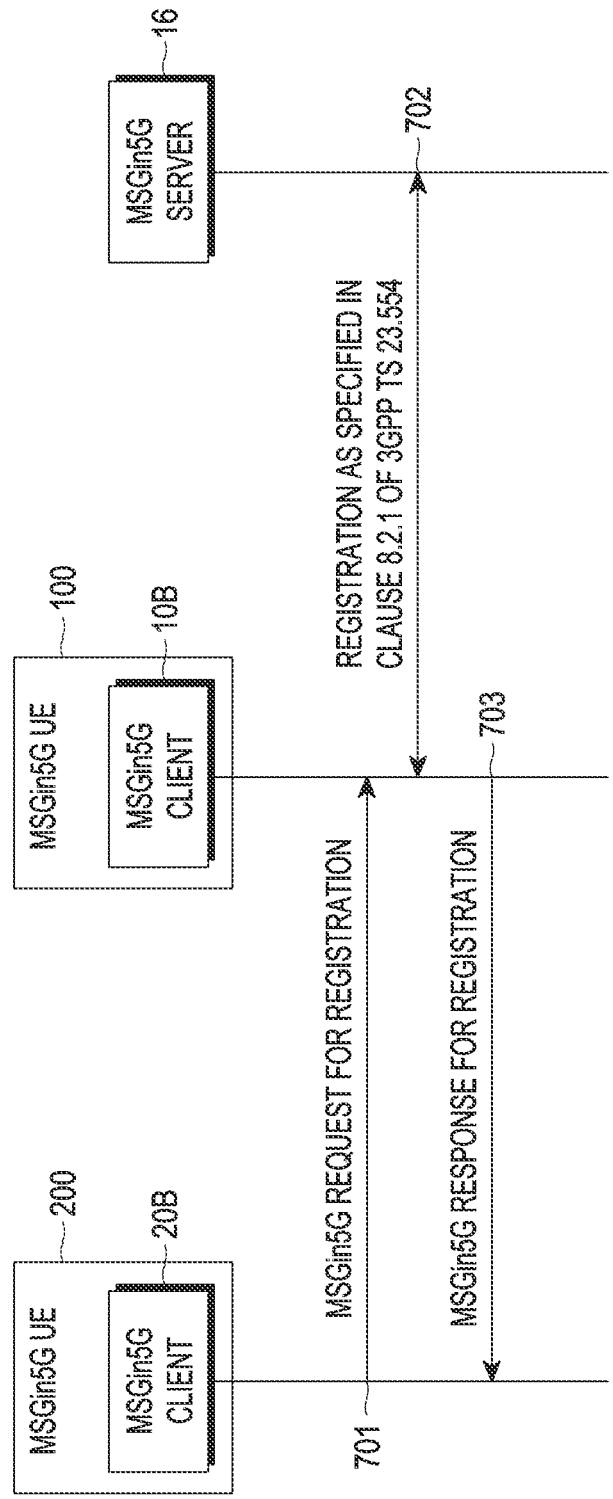
FIG. 7 is a signaling diagram illustrating registration of the constrained device with the MSGin5G server, according to an embodiment of the disclosure.

FIG. 7 is a signaling diagram illustrating registration of the constrained device (200) with the MSGin5G server (16), according to an embodiment of the disclosure.

Referring to FIG. 7, the MSGin5G client (20B) is responsible for triggering the registration to the MSGin5G server (16). The trigger for registration is based on an application service logic. Consider, the MSGin5G UE (100) is connected to the access network that provides connectivity to the MSGin5G server (16). The MSGin5G UE (200) does not have a connection to the access network that provides connectivity to the MSGin5G server (16). The MSGin5G client (20B) has been configured with the MSGin5G server identity. The MSGin5G server (16) has been configured with the necessary credentials to enable authenticating the MSGin5G client (20B). The MSGin5G UE (200) has discovered the MSGin5G UE (100) having connectivity to the MSGin5G server (16), and have mutually authenticated each other.

At operation 701, upon receiving a request from the application client (20A) on the MSGin5G UE (200) to register with the MSGin5G server (16), the MSGin5G client (20B) sends the MSGin5G request for registration to the MSGin5G client (10B). The request includes security credentials required for the MSGin5G client (20B) to register to the MSGin5G server (16). Information elements in the request are given in Table 1.

TABLE 1

MSGin5G request for registration message

| Information element | Status | Description |
| --- | --- | --- |
| UE ID | M | Identity of the UE hosting the MSGin5G client (e.g., the external identifier defined in TS 23.682 [x], or a Mobile Station Integrated Services Digital Network (MSISDN)) |
| MSGin5G client capabilities | O | A list of the MSGin5G capabilities supported by the MSGin5G client (e.g., Mobile Originated Mobile Terminated (MOMT) (i.e., point-to-point message), Application Oriented Mobile Terminated (AOMT) (i.e., application-to-point message), Mobile Originated, Application Terminated (MOAT) (i.e., point-to-application message, Group, Broadcast) |
| MSGin5G service ID | O | MSGin5G client identifier assigned to the MSGin5G client by the MSGin5G server upon initial registration. This element is added while performing registration update. |
| AS service ID | M | Identity of the MSGin5G server to which the 5GMSGS client (20B) intends to register. |

At operation 702, upon receiving the request from the MSGin5G client (20B), the MSGin5G client (10B) may reject the MSGin5G request for registration based on the local condition (like available power or connectivity to access network or any other reason outside the scope of 3GPP). If the MSGin5G client (10B) decides to reject the MSGin5G request for the registration message, then the MSGin5G client (10B) performs operation 703. Otherwise, the MSGin5G client (10B) performs the registration procedure as specified in clause 8.2.1 of 3GPP TS 23.554, with the following clarification and additional information elements defined in Table 2.

TABLE 2

Additional information for MSGin5G Client Registration request

| Information element | Status | Description |
| --- | --- | --- |
| MSGin5G service ID of the UE acting as a message | O | MSGin5G client identifier of the MSGin5G client (10B) who sends |

TABLE 2-continued

Additional information for MSGin5G Client Registration request

| Information element | Status | Description |
| --- | --- | --- |
| gateway UE | | registration request for MSGin5G client (20B). |

The UE ID in the MSGin5G client registration request is set to UE ID received in the MSGin5G request for registration message. The MSGin5G client capabilities in the MSGin5G client registration request is set to the MSGin5G client capabilities received in the request for registration message. The MSGin5G client (10B) may decide to use different client ports other than the ports used in its own registration request. The MSGin5G server (16) accepts the registration request from the MSGin5G client (10B) on behalf of the MSGin5G client (20B) based on the security credentials provided in the registration request message, and further upon successful registration stores the mapping where the MSGin5G client (10B) acting as the message gateway device to the MSGin5G client (20B). The mapping will be used while sending the message to the MSGin5G client (20B).

At operation 703, upon deciding the reject the request for registration message in the operation 702 or upon receiving a response from MSGin5G server (16), the MSGin5G client (10B) sends a MSGin5G response for registration message to the MSGin5G client (20B) indicating success or failure of the registration. In case of successful registration, the MSGin5G client (10B) includes the MSGin5G service ID assigned by the MSGin5G server (16) to the MSGin5G client (20B). In case of failure, the MSGin5G client (10B) includes a reason for the failure in the notification message. The MSGin5G client (10B) may act as a relay for multiple constrained devices. The MSGin5G client (10B) needs to maintain a mapping between the UE ID, and the AS server ID, and the MSGin5G service ID of the device initiated the request.

Figure 8:
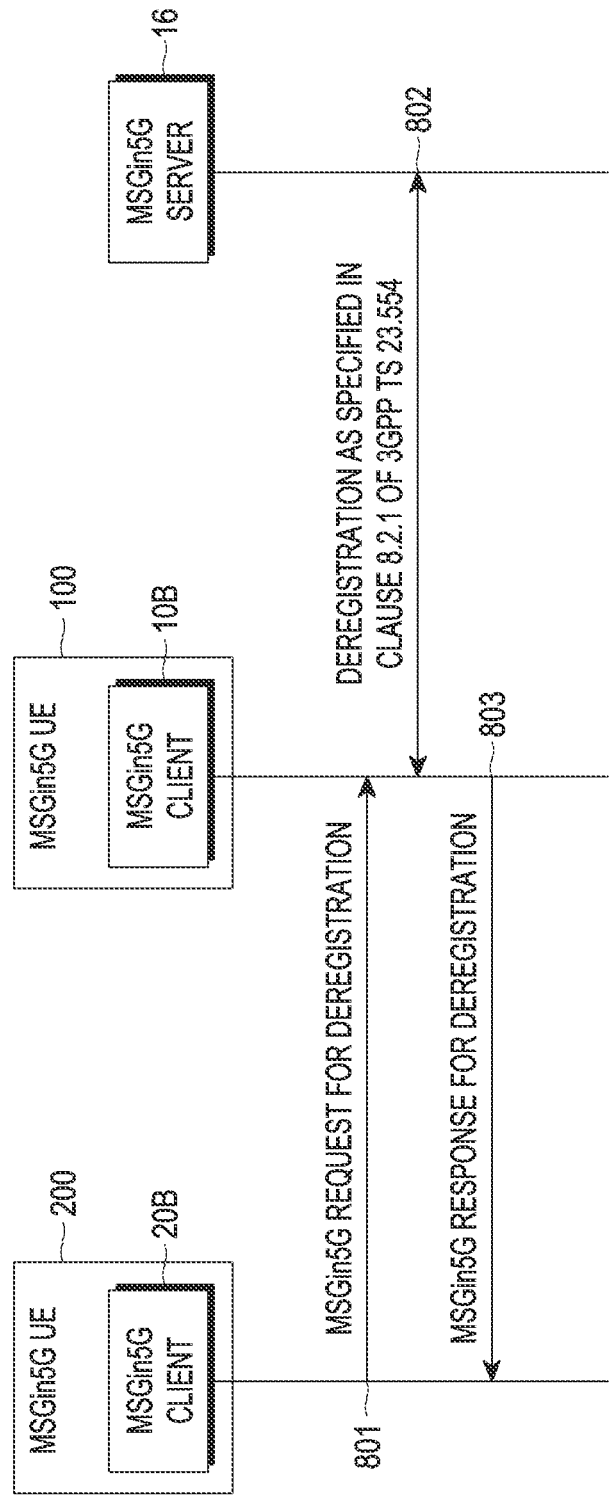
FIG. 8 is a signaling diagram illustrating deregistration of the constrained device with the MSGin5G server, according to an embodiment of the disclosure.

FIG. 8 is a signaling diagram illustrating the deregistration of the constrained device with the MSGin5G server (16), according to an embodiment of the disclosure.

Referring to FIG. 8, the MSGin5G client (20B) is responsible for triggering the deregistration to the MSGin5G server (16). The trigger for deregistering is based on the application service logic. Consider, the MSGin5G UE (100) is connected to the access network that provides connectivity to the MSGin5G server (16). The MSGin5G UE (200) does not have a connection to the access network that provides connectivity to the MSGin5G server (16). The MSGin5G server (16) has been configured with the necessary credentials to enable authenticating the MSGin5G client (20B). The MSGin5G UE (200) has discovered the MSGin5G UE (100) having connectivity to the MSGin5G server (16), and have mutually authenticated each other. The MSGin5G client (20B) has been registered with the MSGin5G server (16) using the MSGin5G UE (100) as the message gateway device.

At operation 801, upon receiving a request from the application client (20A) on the MSGin5G UE (200) to deregister with the MSGin5G server (16), the MSGin5G client (20B) sends a MSGin5G request for deregistration message to the MSGin5G client (10B). Information elements in the request are defined in Table 3.

TABLE 3

| MSGin5G request for deregistration message | | |
|---|---|---|
| Information element | Status | Description |
| MSGin5G service ID | M | MSGin5G client identifier assigned to the MSGin5G client by the MSGin5G server upon initial registration. |

At operation 802, upon receiving the request from the MSGin5G client (20B), the MSGin5G client (10B) performs the deregistration procedure as specified in clause 8.2.1 of 3GPP TS 23.554. The MSGin5G server (16) removes the mapping where the MSGin5G client (10B) acts as the message gateway device to the MSGin5G client (20B). At operation 803, upon receiving a response from the MSGin5G server (16), the MSGin5G client (10B) sends a MSGin5G response for deregistration message to the MSGin5G client (10B) indicating success or failure of the deregistration.

Figure 9:
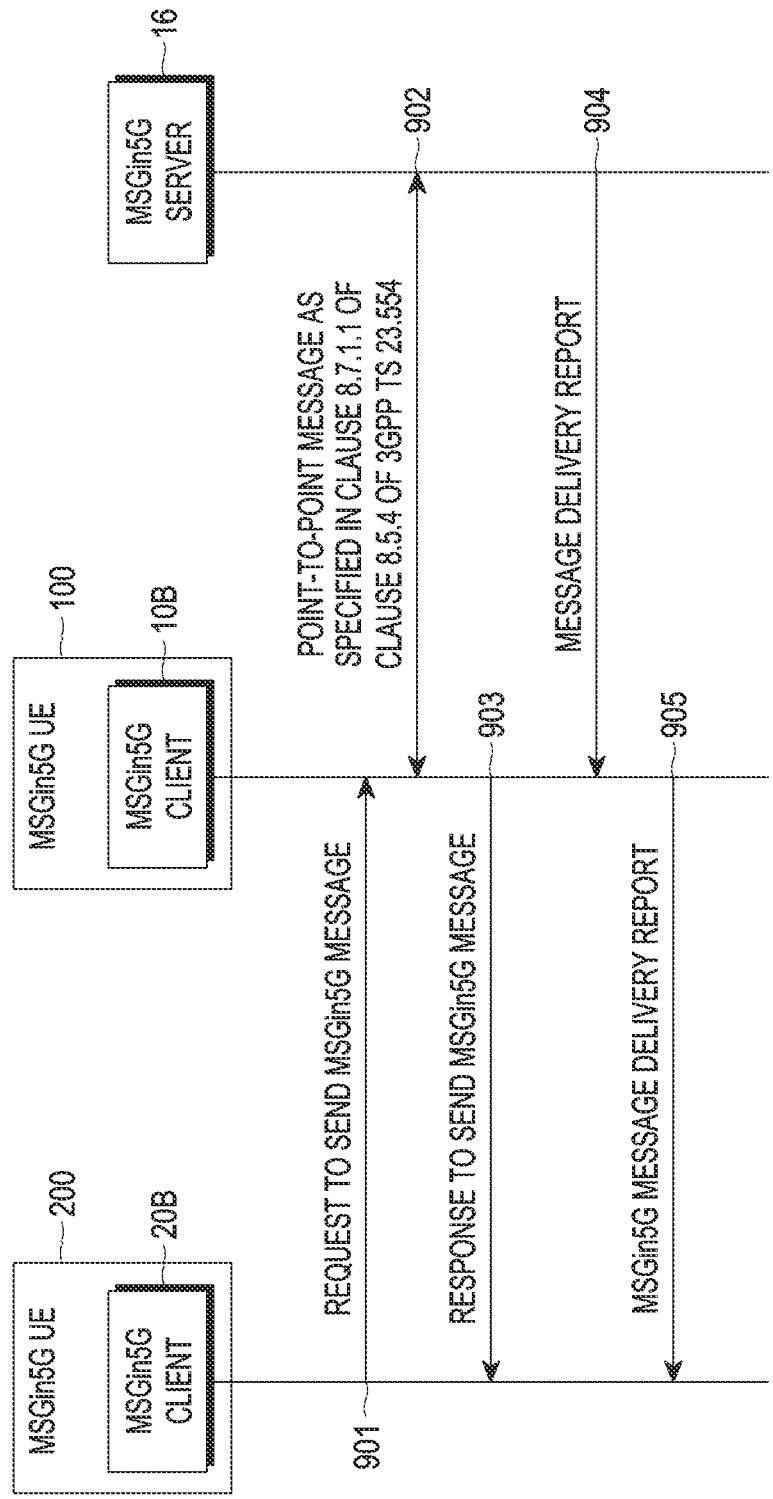
FIG. 9 is a signaling diagram illustrating a scenario of sending a point-to-point message to the MSGin5G server by the constrained device, according to an embodiment of the disclosure.

FIG. 9 is a signaling diagram illustrating a scenario of sending the point-to-point message to the MSGin5G server (16) by the constrained device (200), according to an embodiment of the disclosure.

Referring to FIG. 9, consider, the MSGin5G UE (100) is connected to the access network that provides connectivity to the MSGin5G server (16). The MSGin5G UE (200) does not have a connection to the access network that provides connectivity to the MSGin5G server (16). The MSGin5G client (20B) has registered with the MSGin5G server (16) using MSGin5G UE (100) which is acting as the message gateway device. At operation 901, upon receiving a request from the application client (20A) on the MSGin5G UE (200) to send the point-to-point message, the MSGin5G client (20B) sends a request to send the MSGin5G message to the MSGin5G client (10B). Information elements in the request to send MSGin5G message is given in table 8.3.2-1 of 3GPP TS 23.554.

At operation 902, upon receiving the request from the MSGin5G client (20B), the MSGin5G client (10B) may reject the request to send the MSGin5G message based on the local condition (like available power or connectivity to access network or any other reason outside the scope of 3GPP). If the MSGin5G client (10B) decides to reject the request, then the MSGin5G client (10B) decides to perform operation 903. Otherwise, if the size of the received message exceeds the maximum allowed packet size, the MSGin5G client (10B) sends the point-to-point message as specified in clause 8.5.4 of 3GPP TS 23.554. If the size of the received message does not exceed the maximum allowed packet size, then the MSGin5G client (10B) sends the point-to-point message as specified in the clause 8.7.1.1 of 3GPP TS 23.554. The MSGin5G client (10B) uses the information elements received in request to send the MSGin5G message request from the MSGin5G client (20B) to send the MSGin5G message request with additional information elements defined in Table 4.

TABLE 4

| Additional information for MSGin5G message request | | |
|---|---|---|
| Information element | Status | Description |
| MSGin5G service ID of UE acting as a message gateway | O | MSGin5G client identifier of the MSGin5G client (10B) who sends |

TABLE 4-continued

| Additional information for MSGin5G message request | | |
|---|---|---|
| Information element | Status | Description |
| | UE | point-to-point message for MSGin5G client (20B). |

At operation 903, the MSGin5G client (10B) sends a response to send MSGin5G message to the MSGin5G client (20B). If the MSGin5G client (10B) has decided to reject the request to send the message in operation 902 or the MSGin5G client (10B) received reject response from the MSGin5G server (16) in operation 902, then the MSGin5G client (10B) sends a failure response to the MSGin5G client (20B) and stops performing further operations. Otherwise, the MSGin5G client (10B) sends a success response to the MSGin5G client (20B). At 904, if the delivery status is enabled while sending the message, then the MSGin5G client (10B) receives the delivery report from the MSGin5G server (16). At operation 905, upon receiving the delivery report, the MSGin5G client (10B) sends the delivery report to the MSGin5G client (20B).

Figure 10:
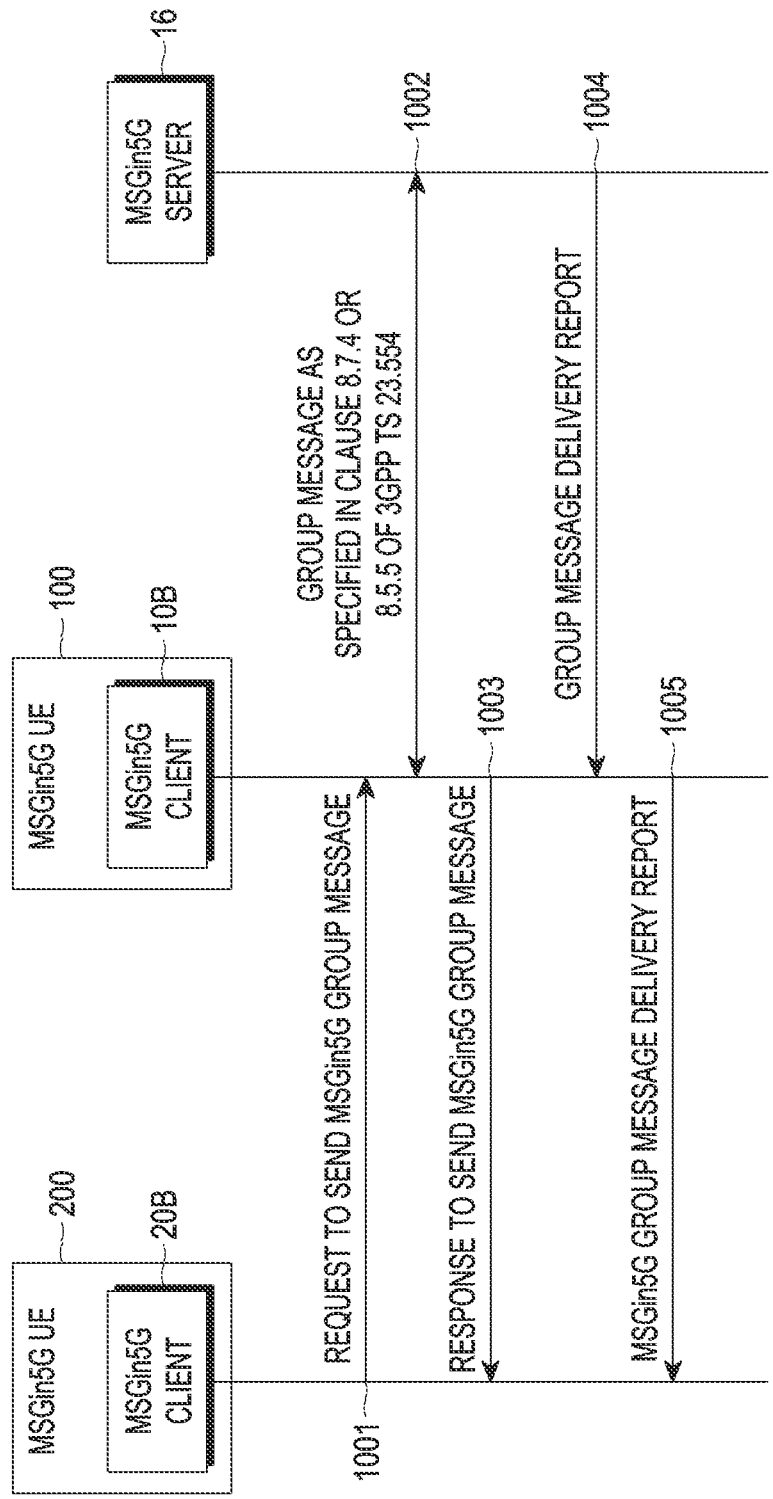
FIG. 10 is a signaling diagram illustrating a scenario of sending a group message to the MSGin5G server by the constrained device, according to an embodiment of the disclosure.

FIG. 10 is a signaling diagram illustrating a scenario of sending the group message to the MSGin5G server (16) by the constrained device (200), according to an embodiment of the disclosure.

Referring to FIG. 10, consider, the MSGin5G UE (100) is connected to the access network that provides connectivity to the MSGin5G server (16). The MSGin5G UE (200) does not have a connection to the access network that provides connectivity to the MSGin5G server (16). The MSGin5G client (20B) has registered with the MSGin5G server (16) using the MSGin5G UE (100) which is operating as the message gateway device. A MSGin5G group is created by following group management SEAL service procedures as specified in 3GPP TS 23.434, and the MSGin5G UE (200) is a member of the group.

At operation 1001, upon receiving a request from the application client (20A) on the MSGin5G UE (200) to send the group message, the MSGin5G client (20B) sends the request to send MSGin5G group message to the MSGin5G client (10B). The request includes the information elements given in table 8.3.2-1 of 3GPP TS 23.554. At operation 1002, upon receiving the request from the MSGin5G client (20B), the MSGin5G client (10B) may reject the request to send the MSGin5G message based on the local condition (like available power or connectivity to access network or any other reason outside the scope of 3GPP). If the MSGin5G client (10B) decides to reject the request, then the MSGin5G client (10B) performs operation 1003. Otherwise, if the size of the received message exceeds the maximum allowed packet size, the MSGin5G client (10B) sends the group message as specified in clause 8.5.5 of 3GPP TS 23.554. If the size of the received message does not exceed the maximum allowed packet size, the MSGin5G client (10B) sends the group message as specified in clause 8.7.4 of 3GPP TS 23.554. The 5GMSGS client (10B) uses the information elements received in the request to send the MSGin5G message request from the MSGin5G client (20B) to send the MSGin5G message request to the MSGin5G server (16) with additional information elements defined in Table 5.

TABLE 5

Additional information for MSGin5G message request

| Information element | Status | Description |
|---|---|---|
| MSGin5G Service ID of UE acting as a message gateway UE | O | MSGin5G client identifier of the MSGin5G client (10B) who sends point-to-point message for MSGin5G client (20B) |

At operation 1003, the MSGin5G client (10B) sends a response to send MSGin5G group message to the MSGin5G client (20B). If the MSGin5G client (10B) has decided to reject the request to send the message in operation 1002 or the MSGin5G client (10B) received reject response from the MSGin5G server (16) in operation 1002, the MSGin5G client (10B) sends the failure response to the MSGin5G client (20B) and stops performing further operations. Otherwise, the MSGin5G client (10B) sends the success response to the MSGin5G client (20B). At operation 1004, if the delivery status is enabled while sending the message, the MSGin5G client (10B) may receive the delivery report(s) from the MSGin5G server (16). At operation 1005, upon receiving the delivery report(s), the MSGin5G client (10B) sends the delivery report(s) to the MSGin5G client (20B).

Figure 11:
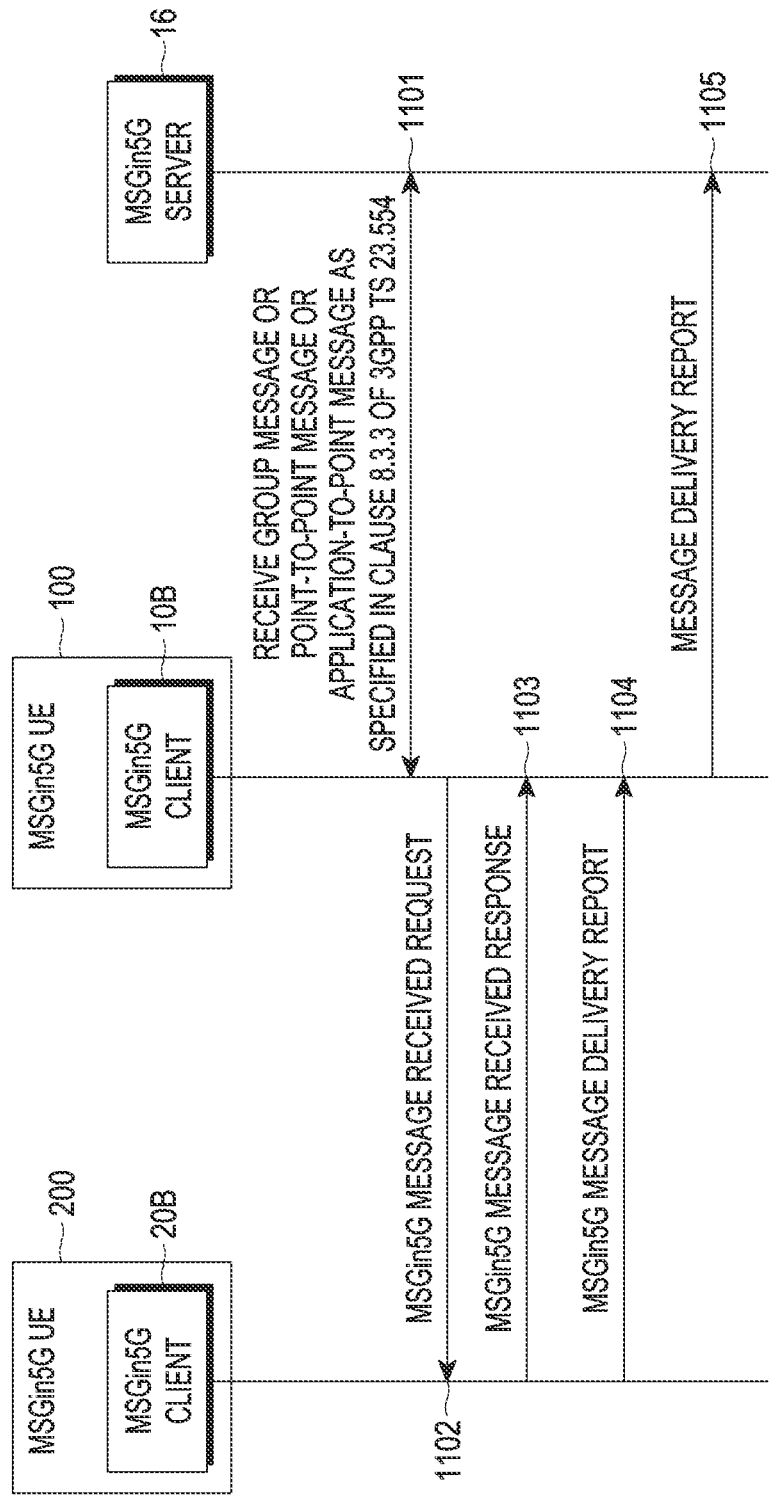
FIG. 11 is a signaling diagram that illustrates a scenario of receiving a message from the MSGin5G server by the constrained device, according to an embodiment of the disclosure.

FIG. 11 is a signaling diagram illustrates a scenario of receiving the message from the MSGin5G server (16) by the constrained device (200), according to an embodiment of the disclosure. The message can be the group message or the point-to-point message or the point-to-application message.

Referring to FIG. 11, consider, the MSGin5G UE (100) is connected to the access network that provides connectivity to the MSGin5G server (16). The MSGin5G UE (200) does not have a connection to the access network that provides connectivity to the MSGin5G server (16). The MSGin5G client (20B) has registered with the MSGin5G server (16) using the MSGin5G UE (100) which is acting as a message gateway device.

At operation 1101, the MSGin5G client (10B) receives either the group message or the point-to-point message or the application-to-point message from the MSGin5G server (16) for the MSGin5G client (20B) for which the MSGin5G client (10B) is acting as the message gateway device as specified in clause 8.3.3 of 3GPP TS 23.554. The MSGin5G client (10B) performs reassembly of the received message that is segmented. The MSGin5G client (10B) may also perform a segment recovery procedure to recover missing segments.

At operation 1102, upon successfully receiving the message for the MSGin5G client (20B), the MSGin5G client (10B) sends the MSGin5G message received request to the MSGin5G client (20B). The information elements of the MSGin5G message received request are defined in Table 6.

TABLE 6

MSGin5G message received request

| Information element | Status | Description |
|---|---|---|
| Originator MSGin5G service ID | M | The identity of the MSGin5G client who initiated the message. |
| Group ID | O | The identifier of the MSGin5G Group to which the message is sent |
| Message ID | M | Unique identifier of this message |
| Disposition Type | O | Indicates the disposition type expected from the receiver (i.e., delivered) as |

TABLE 6-continued

MSGin5G message received request

| Information element | Status | Description |
|---|---|---|
| | | specified in Group Message Request received from originating MS client |
| Application ID | O | Identifies the application for which the payload is intended as specified in Group Message Request received from originating MSGin5G client |
| Payload | M | Payload of the message |
| Priority Type | O | Application priority level requested for this message as specified in Group Message Request received from originating MSGin5G client. |

At operation 1103, upon successfully receiving the message, the MSGin5G client (20B) sends the MSGin5G send message response to the MSGin5G client (10B). At operation 1104, if the delivery report is required, the MSGin5G client (20B) sends the delivery report to the MSGin5G client (10B). At operation 1105, upon receiving the delivery report, the MSGin5G client (10B) sends the delivery report to the MSGin5G server (16).

Figure 12:
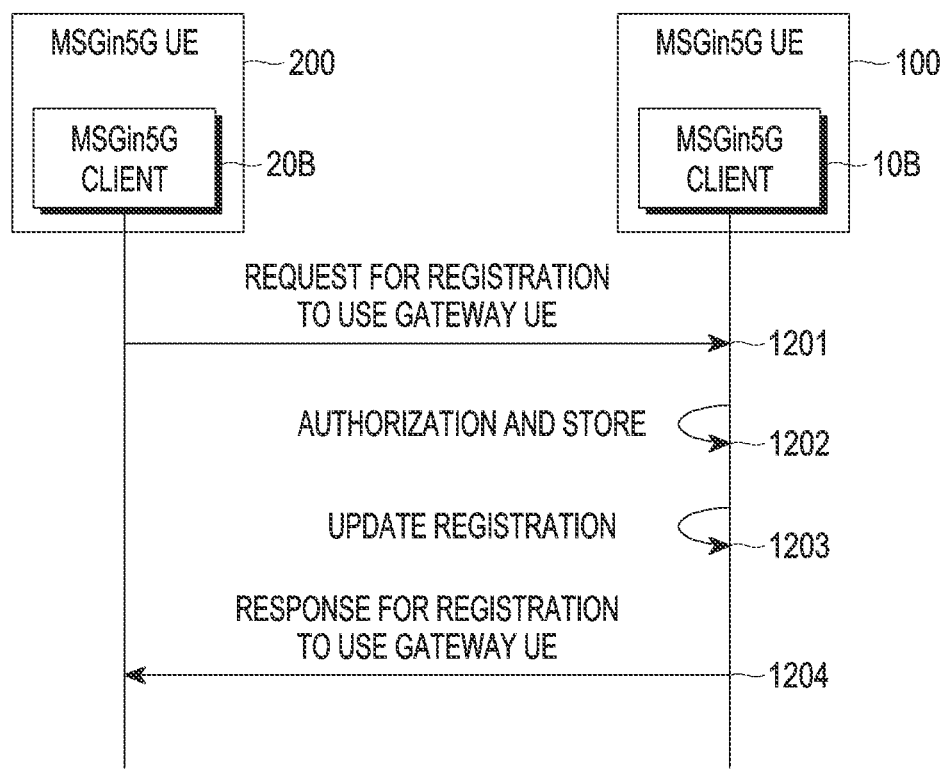
FIG. 12 is a signaling diagram illustrating registration of the constrained device with the unconstrained device for using a gateway UE functionality, according to an embodiment of the disclosure.

FIG. 12 is a signaling diagram illustrating registration of the constrained device (200) with the unconstrained UE (100) for using the gateway functionality, according to an embodiment of the disclosure.

Referring to FIG. 12, the signaling flow for registration of the application client (20A) on the MSGin5G UE (200) with the MSGin5G client (10B) to use the MSGin5G UE (100) as the gateway device. Consider, the MSGin5G UE (100) is connected to the access network that provides connectivity to the MSGin5G server (16). The MSGin5G UE (100) is configured with information to recognize and authorize the MSGin5G UE (200). The MSGin5G UE (200) does not have the access network connection to connect with the MSGin5G server (16). The MSGin5G UE (200) has discovered that the MSGin5G UE (100) is having connectivity to the MSGin5G server (16) and offers the gateway functionality.

At operation 1201, the application client (20A) on the MSGin5G UE (200) registers with the MSGin5G client (10B) in MSGin5G UE (100) to request the MSGin5G client (10B) to act as the gateway UE. The request message includes information elements as specified in Table 7.

TABLE 7

Information elements for request for registration to use gateway functionality

| Information element | Status | Description |
|---|---|---|
| Layer-2 ID | M | Layer-2 identity of MS Gin5G UE (100) |
| Application ID | M | Application ID of the application client on MSGin5G UE (200) |

At operation 1202, upon receiving the request from the application client (20A), the MSGin5G client (10B) rejects the request for registration to use the gateway functionality based on the local condition (like available power or connectivity to access network or any other reason outside the scope of 3GPP). If the MSGin5G client (10B) decides to reject the request for registration to use gateway functionality, then proceed to operation 1204. Otherwise, the MSGin5G client (10B) authorize the application client (20A), on the MSGin5G UE (200) to use the gateway functionality, and the MSGin5G client (10B) stores the mapping between the application ID and the layer-2 ID of the MSGin5G UE (200). If authorization fails, then proceed to the operation 1204. The MSGin5G client (10B) may have a list of MSGin5G UEs configured that can use the gateway functionalities or may send authorization message to the MSGin5G server (16) to check whether the MSGin5G UE (200) is authorized to use the gateway functionality.

At operation 1203, the MSGin5G client (10B) updates its own registration with MSGin5G server (16) to include the application ID. At operation 1204, the MSGin5G client (10B) sends response to the application client (20A). If the MSGin5G client (10B) decided to reject the request for registration to use the gateway functionality or if authorization fails as in operation 1202, the MSGin5G client (10B) sends the failure response to the application client (20A). Otherwise, the MSGin5G client (10B) sends the success response to the application client (20A). The MSGin5G client (10B) may act as the gateway device for multiple constrained devices at the same time. In an embodiment, upon receiving the MSGin5G message, the MSGin5G UE (100) uses the mapping created at time of successful registration to identify target constrained device and sends message to the target constrained device. In another embodiment, the procedure is also applicable for mission critical gateway, where non-3GPP devices, which cannot host mission critical clients, act as the MSGin5G UE (200), and a mission critical gateway UE act as the MSGin5G UE (100).

Figure 13:
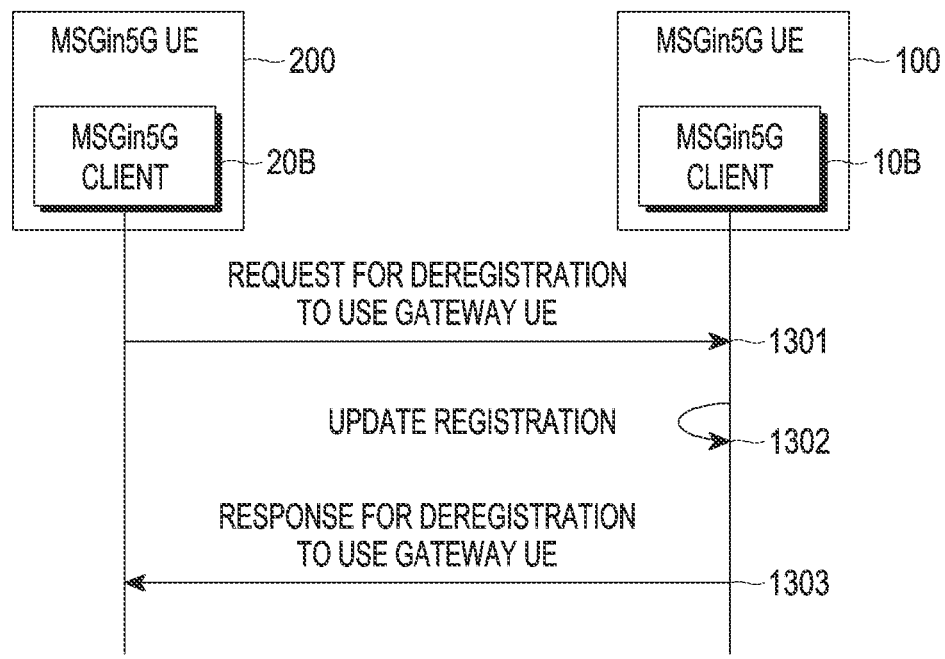
FIG. 13 is a signaling diagram illustrating deregistration of the constrained device with the unconstrained device for discontinuing usage of the gateway functionality, according to an embodiment of the disclosure.

FIG. 13 is a signaling diagram illustrating the deregistration of the constrained device (200) with the unconstrained UE (100) for discontinuing usage of the gateway functionality, according to an embodiment of the disclosure.

Referring to FIG. 13, consider, the MSGin5G UE (100) is connected to the access network that provides connectivity to the MSGin5G server (16). The MSGin5G UE (200) is successfully connected to MSGin5G UE (100) acting as the gateway device. At operation 1301, the application client (20A) on the MSGin5G UE (200) deregisters with the MSGin5G client (10B) in MSGin5G UE (100) to discontinue usage of the gateway functionality of the MSGin5G UE (100). The request message includes information elements as specified in Table 7. At operation 1302, upon receiving the request from the application client (20A), the MSGin5G client (10B) removes the mapping between the application ID and the layer-2 ID of the MSGin5G UE (200), and updates its own registration with the MSGin5G server (16) to update the application ID. At operation 1303, the MSGin5G client (10B) sends the response to the application client (20A) on the MSGin-5G UE (200).

The proposed method is used for constrained UE (200) to register with the unconstrained UE (100) to enable and use the gateway functionality. Further, the proposed method is used for the constrained UE (200) to deregister with the unconstrained UE (100) to discontinue use of the gateway functionality. Furthermore, the proposed method is used for the gateway device to find the target constrained device (200) for whom the message has been received.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for communicating with a message in fifth generation (MSGin5G) server by a first user equipment (UE), the method comprising:
   receiving, by the first UE from a second UE, a registration request comprising a security credential required for the second UE to register to the MSGin5G server; and
   transmitting, to the second UE, a registration response indicating success or failure of a registration performed by the first UE for the second UE based on the registration request,
   wherein the first UE is a constrained device or an unconstrained device with advanced capabilities, and the first UE communicates with the MSGin5G server over MSGin5G-1 reference point, and
   wherein the second UE is a constrained device not having a capability to communicate with the MSGin5G Server.

2. The method as claimed in claim 1,
   wherein the first UE acts as a UE Message Gateway to the second UE.

3. The method as claimed in claim 1,
   wherein a MSGin5G service provided by the MSGin5G server supports both a constrained device with limited capabilities and an unconstrained device with advanced capabilities,
   wherein a protocol conversion function in the MSGin5G Server converts one protocol format into another protocol format.

4. The method as claimed in claim 1,
   wherein the registration request comprises at least one of:
   an identity of the second UE hosting a MSGin5G Client, a list of MSGin5G capabilities supported by the MSGin5G Client, a MSGin5G Client identifier assigned to the MSGin5G Client by the MSGin5G Server upon initial registration, and
   an identity of the MSGin5G server to which the MSGin5G Client intends to register to.

5. The method as claimed in claim 1, further comprising:
   rejecting the registration request based on local condition, wherein the registration response includes information on reason for the failure.

6. The method as claimed in claim 1, further comprising:
   performing a registration procedure for the second UE with the MSGin5G server, wherein the registration response includes a MSGin5G Service ID assigned by MSGin5G server to a MSGin5G Client of the second UE.

7. The method as claimed in claim 1, further comprising:
   receiving, from the second UE, request to send MSGin5G message;
   transmitting, to the second UE, response to send the MSGin5G message; and
   transmitting, to the second UE, MSGin5G message delivery report, wherein the MSGin5G message is a point-to-point message or a group message.

8. The method as claimed in claim 1, further comprising:
   transmitting, to the second UE, MSGin5G message received request;
   receiving, from the second UE, MSGin5G message received response; and receiving, from the second UE, MSGin5G message delivery report.

9. The method as claimed in claim 8, wherein the MSGin5G message received request comprises at least one of:
an identity of MSGin5G client who initiated the MSGin5G message received request,
an identifier of a MSGin5G Group to which the MSGin5G message received request is sent,
an identifier of the MSGin5G message received request,
disposition type,
application ID,
payload of the MSGin5G message received request, and
priority type indicating application priority level requested for the MSGin5G message received request.

10. A method for communicating with a message in fifth generation (MSGin5G) server by a second user equipment (UE), the method comprising:
transmitting, to a first UE, a registration request comprising a security credential required for the second UE to register to the MSGin5G server; and
receiving, from the first UE, a registration response indicating success or failure of a registration performed by the first UE for the second UE based on the registration request,
wherein the first UE is a constrained device or an unconstrained device with advanced capabilities, and the first UE communicates with the MSGin5G server over MSGin5G-1 reference point, and
wherein the second UE is a constrained device not having a capability to communicate with the MSGin5G Server.

11. The method as claimed in claim 10, wherein the first UE acts as a UE Message Gateway to the second UE.

12. The method as claimed in claim 10, wherein the registration request comprises at least one of:
an identity of the second UE hosting a MSGin5G Client,
a list of MSGin5G capabilities supported by the MSGin5G Client,
a MSGin5G Client identifier assigned to the MSGin5G Client by the MSGin5G Server upon initial registration, and
an identity of the MSGin5G server to which the MSGin5G Client intends to register to.

13. An first user equipment (UE) for communicating with a message in fifth generation (MSGin5G) server, the first UE comprising:
a transceiver; and
a controller coupled with the transceiver and configured to control to:
receive, from a second UE, a registration request comprising a security credential required for the second UE to register to the MSGin5G server, and
transmit, to the second UE, a registration response indicating success or failure of a registration performed by the first UE for the second UE based on the registration request,
wherein the first UE is a constrained device or an unconstrained device with advanced capabilities, and the first UE communicates with the MSGin5G server over MSGin5G-1 reference point, and
wherein the second UE is a constrained device not having a capability to communicate with the MSGin5G Server.

14. A second user equipment (UE) for communicating with a message in fifth generation (MSGin5G) server, the second UE comprising:
a transceiver; and
a controller coupled with the transceiver and configured to control to:
transmit, to a first UE, a registration request comprising a security credential required for the second UE to register to the MSGin5G server, and
receive, from the first UE, a registration response indicating success or failure of a registration performed by the first UE for the second UE based on the registration request,
wherein the first UE is a constrained device or an unconstrained device with advanced capabilities, and the first UE communicates with the MSGin5G server over MSGin5G-1 reference point, and
wherein the second UE is a constrained device not having a capability to communicate with the MSGin5G Server.

* * * * *